United States Patent
Kaye, Jr. et al.

(10) Patent No.: US 9,981,406 B2
(45) Date of Patent: May 29, 2018

(54) DRILL BIT

(71) Applicant: BLACK & DECKER INC., Newark, DE (US)

(72) Inventors: Thomas R. Kaye, Jr., Fallston, MD (US); David N. Johnson, Doncaster (GB); Christian Bluemel, Waldkirchen (DE)

(73) Assignee: Black & Decker Inc., New Britain, CT (US)

( * ) Notice: Subject to any disclaimer, the term of this patent is extended or adjusted under 35 U.S.C. 154(b) by 439 days.

(21) Appl. No.: 14/749,983

(22) Filed: Jun. 25, 2015

(65) Prior Publication Data

US 2016/0375500 A1 Dec. 29, 2016

(51) Int. Cl.
 B28D 1/14 (2006.01)
 B23B 51/02 (2006.01)

(52) U.S. Cl.
 CPC .............. B28D 1/146 (2013.01); B23B 51/02 (2013.01); *B23B 2226/75* (2013.01); *B23B 2251/14* (2013.01); *B23B 2251/207* (2013.01); *B23B 2251/406* (2013.01); *B23B 2251/48* (2013.01); *B23B 2251/50* (2013.01)

(58) Field of Classification Search
 CPC . B23B 51/046; B23B 51/02; B23B 2251/207; B23B 2251/50; B23B 2251/406; B23B 2251/14; B23B 2251/48; B23B 2226/75; B28D 1/146; E21B 10/44; E21B 10/485; E21B 10/445; E21B 10/54
 USPC ........................................................ 408/230
 See application file for complete search history.

(56) References Cited

U.S. PATENT DOCUMENTS

| | | |
|---|---|---|
| 1,734,469 A | 11/1929 | Journeay |
| 2,097,030 A | 10/1937 | Kilgore |
| 2,099,677 A * | 11/1937 | Cunningham .......... E21B 17/04 |
| | | 175/420 |

(Continued)

FOREIGN PATENT DOCUMENTS

| | | |
|---|---|---|
| DE | 919402 A | 10/1954 |
| DE | 4306981 A1 | 9/1994 |
| EP | 2669033 A1 | 4/2013 |

OTHER PUBLICATIONS

Lorence, Xavier—Extended European Search Report re: related European Patent Application No. EP16175653—Mar. 23, 2017—7 pages—The Hague.

*Primary Examiner* — Michael R Willls, III
(74) *Attorney, Agent, or Firm* — Scott B. Markow

(57) ABSTRACT

A drill bit has a shank, an intermediate shaft, and a cutting head and defines a longitudinal axis. The cutting head has a body having a front end, a rear end, and a peripheral sidewall, a primary cutting insert and a pair of auxiliary cutting inserts. The primary cutting insert is cross-shaped with a central portion with a cutting tip and four cutting arms each with a cutting edge extending radially outward from the central portion past the peripheral sidewall. The auxiliary cutting inserts are spaced radially outward from the central portion and circumferentially from the radial cutting arms, and have a cutting edge extending radially outward past the peripheral sidewall. A pair of primary dust egress slots and a pair of auxiliary dust egress slots are formed in the peripheral sidewall and configured to channel debris from the front end to the rear end of the body.

25 Claims, 16 Drawing Sheets

(56) References Cited

U.S. PATENT DOCUMENTS

| | | | |
|---|---|---|---|
| 2,107,286 A | | 2/1938 | Cunningham |
| 2,213,498 A | | 9/1940 | Kinzbach |
| 3,388,757 A | | 6/1968 | Fittinger |
| 4,889,017 A | | 12/1989 | Fuller et al. |
| 4,903,787 A | * | 2/1990 | Moser .................. E21B 10/455 175/415 |
| 4,942,933 A | | 7/1990 | Barr et al. |
| 5,779,403 A | | 7/1998 | Kleine et al. |
| 5,836,410 A | * | 11/1998 | Kleine .................. E21B 10/445 175/415 |
| 6,089,336 A | | 7/2000 | Nexton et al. |
| 6,283,232 B1 | * | 9/2001 | Batliner .................. B23B 51/02 175/415 |
| 6,588,519 B2 | | 7/2003 | Knoller |
| 6,601,659 B2 | * | 8/2003 | Saitta ...................... B23B 51/02 175/323 |
| 7,225,890 B2 | * | 6/2007 | Meierhofer ............. B23B 51/02 175/395 |
| 7,861,807 B2 | * | 1/2011 | Probst .................... B23B 51/02 175/415 |
| 7,913,777 B2 | * | 3/2011 | Rieger .................... B23B 51/02 175/323 |
| 8,851,207 B2 | | 10/2014 | Gavia et al. |
| 9,199,316 B2 | * | 12/2015 | Schwarz ................ B23B 51/02 |
| 2013/0319774 A1 | * | 12/2013 | Hammer ................ E21B 10/44 175/394 |

* cited by examiner

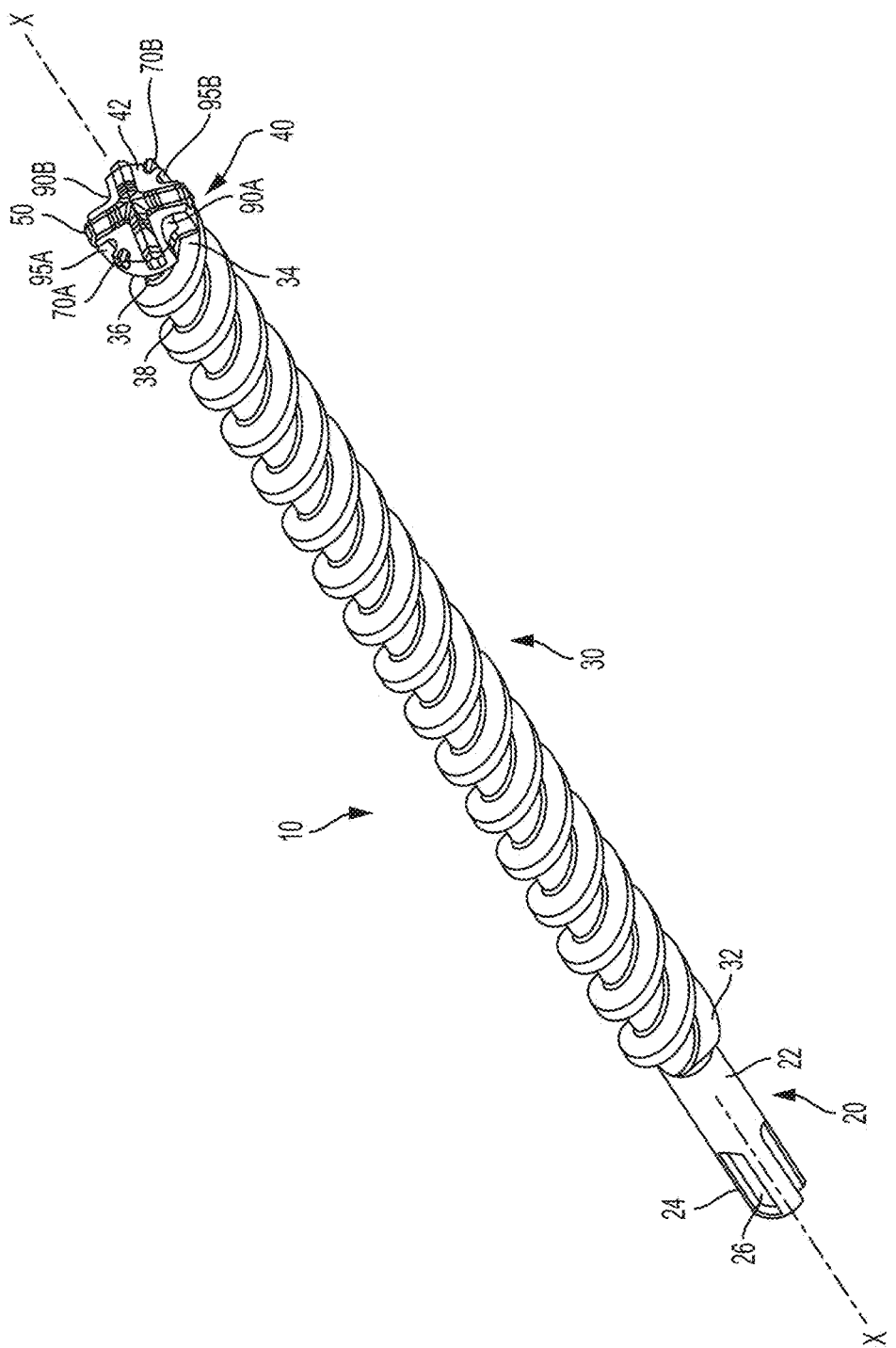

DRILL BIT

TECHNICAL FIELD

This application relates to drill bits for forming holes in masonry, concrete, and stone.

BACKGROUND

Drill bits are known for forming holes in masonry, concrete, and stone. Such drill bits generally have a shank portion configured to couple the drill bit to a power tool (such as a drill driver, an impact driver, a hammer drill, or a rotary hammer), an intermediate shaft having one or more spiral flutes, and a cutting head. One such drill bit is a DeWALT® DT60836-QZ 32-920 XLR® drill bit shown in FIG. 10. This drill bit suffers from several deficiencies, including, for example, a slower than desired cutting speed, a shorter than desired life, and formation of holes that are not perfectly round.

SUMMARY

In an aspect, a drill bit includes a shank having a rear end configured to be coupled to a rotary power tool, an intermediate shaft defining a longitudinal axis and having a rear end coupled to a front end of the shank and at least one spiral flute, and a cutting head. The cutting head includes a body having a rear end coupled to a front end of the intermediate shaft, a front end, and a peripheral sidewall. A primary cutting insert is coupled to a front end of the body, and has a cross-shape with a central portion, and first, second, third, and fourth cutting arms extending radially outward from the central portion. A pair of auxiliary cutting inserts is coupled to the front end. Each of the auxiliary cutting inserts is spaced radially outward from the central portion and spaced circumferentially from each of the radial cutting arms. A first one of the auxiliary cutting inserts is positioned between the first cutting arm and the second cutting arm. A second one of the auxiliary cutting inserts is positioned between the third cutting arm and the fourth cutting arm. A pair of primary dust egress slots is formed in the peripheral sidewall of the body and extends from the front end of the body to the rear end of the body. A first of the primary dust egress slots is positioned between the second and third cutting arms. A second of the primary dust egress slots is positioned between the first and fourth cutting arms. A pair of auxiliary dust egress slots is formed in the peripheral sidewall of the body and extends from the front end of the body to the rear end of the body. A first of the auxiliary dust egress slots is positioned between the first and second cutting arms. A second of the auxiliary dust egress slots positioned between the third and fourth cutting arms.

Implementations of this aspect may include one or more of the following features. The primary cutting insert may be configured to cut a hole in a workpiece, the auxiliary cutting inserts may be configured to break up debris created by the primary cutting insert, and the primary and auxiliary dust egress slots may be configured to enable removal of debris from the hole. The cutting arms may be perpendicular to one another. Each of the cutting arms of the primary cutting insert may extend radially outward past the peripheral sidewall of the body. Each of the cutting arms may have a rake face facing the rotational cutting direction, a relief face facing an opposite rotational direction, and a cutting edge joining the rake face and the relief face.

The pair of auxiliary cutting inserts may comprise only a single pair of auxiliary cutting inserts. Each of the auxiliary cutting inserts may extend radially outward beyond the peripheral sidewall. Each of the cutting arms of the primary cutting insert may extend radially outward beyond the auxiliary cutting inserts. Each of the auxiliary cutting inserts may have a rake face facing the rotational cutting direction, a relief face facing an opposite rotational direction, and a cutting edge joining the rake face and the relief face. Each rake face may include an upper rake face adjacent the cutting edge and a lower rake face adjacent the upper rake face. The upper rake face may extend at a first angle to the longitudinal axis and the second rake face may extend at a larger second angle to the longitudinal axis. The cutting edge of each of the auxiliary cutting inserts may taper from a first axial height at a radially inward portion to a second smaller axial height at a radial outward portion. The first auxiliary cutting insert may be positioned approximately 50°-60° from the first cutting arm in the rotational cutting direction and the second auxiliary cutting insert is positioned approximately 50°-60° from the third cutting arm in the rotational cutting direction.

The primary dust egress slots may be larger than the auxiliary dust egress slots. The first auxiliary dust egress slot may positioned approximately 27°-37° from the first cutting arm in the rotational cutting direction and the second auxiliary dust egress slot is positioned approximately 27°-37° from the third cutting arm in the rotational cutting direction. The auxiliary cutting insets may be offset axially rearward of the radial cutting arms of the primary cutting insert. The at least one spiral flute may include a first spiral flute in communication with the first primary dust egress slot and the first auxiliary dust egress slot, and a second spiral flute in communication with the second primary dust egress slot and the second auxiliary dust egress slot.

In another aspect, a cutting head for a drill bit includes a body having a front end and a peripheral sidewall, and defining a longitudinal axis. A primary cutting insert is coupled to a front end of the body. The primary cutting insert has a cross-shape with a central portion, and first, second, third, and fourth cutting arms extending radially outward from the central portion. A pair of auxiliary cutting inserts is coupled to the front end. Each of the auxiliary cutting inserts is spaced radially outward from the central portion and spaced circumferentially from each of the radial cutting arms. A first one of the auxiliary cutting inserts is positioned between the first cutting arm and the second cutting arm and a second one of the auxiliary cutting inserts positioned between the third cutting arm and the fourth cutting arm. A pair of primary dust egress slots is formed in the peripheral sidewall of the body and extends from the front end of the body to the rear end of the body. A first of the primary dust egress slots is positioned between the second and third cutting arms, and a second of the primary dust egress slots is positioned between the first and fourth cutting arms. A pair of auxiliary dust egress slots is formed in the peripheral sidewall of the body and extends from the front end of the body to the rear end of the body. A first of the auxiliary dust egress slots is positioned between the first and second cutting arms, and a second of the auxiliary dust egress slots is positioned between the third and fourth cutting arms.

Implementations of this aspect may include one or more of the following features. The primary cutting insert may be configured to cut a hole in a workpiece, the auxiliary cutting inserts may be configured to break up debris created by the primary cutting insert, and the primary and auxiliary dust egress slots may be configured to enable removal of debris from the hole. The cutting arms may be perpendicular to one another. Each of the cutting arms of the primary cutting insert may extend radially outward past the peripheral sidewall of the body. Each of the cutting arms may have a rake face facing the rotational cutting direction, a relief face facing an opposite rotational direction, and a cutting edge joining the rake face and the relief face.

The pair of auxiliary cutting inserts may include only a single pair of auxiliary cutting inserts. Each of the auxiliary cutting inserts may extend radially outward beyond the peripheral sidewall. Each of the cutting arms of the primary cutting insert may extend radially outward beyond the auxiliary cutting inserts. Each of the auxiliary cutting inserts may have a rake face facing the rotational cutting direction, a relief face facing an opposite rotational direction, and a cutting edge joining the rake face and the relief face. Each rake face may include an upper rake face adjacent the cutting edge and a lower rake face adjacent the upper rake face, the upper rake face extending at a first angle to the longitudinal axis and the second rake face extending at a larger second angle to the longitudinal axis. The cutting edge of each of the auxiliary cutting inserts may taper from a first axial height at a radially inward portion to a second smaller axial height at a radial outward portion.

The first auxiliary cutting insert may be positioned approximately 50°-60° from the first cutting arm in the rotational cutting direction and the second auxiliary cutting insert may be positioned approximately 50°-60° from the third cutting arm in the rotational cutting direction. The primary dust egress slots may be larger than the auxiliary dust egress slots. The first auxiliary dust egress slot may be positioned approximately 27°-37° from the first cutting arm in the rotational cutting direction and the second auxiliary dust egress slot may be positioned approximately 27°-37° from the third cutting arm in the rotational cutting direction. The auxiliary cutting insets may be offset axially rearward of the radial cutting arms of the primary cutting insert.

In another aspect, a cutting head for a drill bit includes a body having a front end, a rear end, and a peripheral sidewall, and defining a longitudinal axis. A primary cutting insert is coupled to a front end of the body. The primary cutting insert has a cross-shape with a central portion with a central cutting tip positioned on the longitudinal axis, and first, second, third, and fourth cutting arms each having a cutting edge extending radially outward from the central portion past the peripheral sidewall of the body. A pair of auxiliary cutting inserts is coupled to the front end. Each of the auxiliary cutting inserts is spaced radially outward from the central portion, spaced circumferentially from each of the radial cutting arms, and has a cutting edge extending radially outward past the peripheral sidewall of the body. A plurality of dust egress slots are formed in the peripheral sidewall and configured to channel debris from the front end to the rear end of the body.

Implementations of this aspect may include one or more of the following features. The plurality of dust egress slots may include a pair of primary dust egress slots formed in the peripheral sidewall of the body and extending from the front end of the body to the rear end of the body. A first of the primary dust egress slots may be positioned between the second and third cutting arms, and a second of the primary dust egress slots may be positioned between the first and fourth cutting arms. The plurality of dust egress slots may include a pair of auxiliary dust egress slots formed in the peripheral sidewall and extending from the front end of the body to the rear end of the body. A first of the auxiliary dust egress slots may be positioned between the first and second cutting arms, and a second of the auxiliary dust egress slots may be positioned between the third and fourth cutting arms. The first auxiliary dust egress slot may be positioned approximately 27°-37° from the first cutting arm in the rotational cutting direction and the second auxiliary dust egress slot may be positioned approximately 27°-37° from the third cutting arm in the rotational cutting direction.

The primary cutting insert may be configured to cut a hole in a workpiece, and the auxiliary cutting inserts may be configured to break up debris created by the primary cutting insert. The cutting arms may be perpendicular to one another. Each of the cutting arms may have a rake face facing the rotational cutting direction, a relief face facing an opposite rotational direction, and a cutting edge joining the rake face and the relief face. The pair of auxiliary cutting inserts may include only a single pair of auxiliary cutting inserts. Each of the cutting arms of the primary cutting insert may extend radially outward beyond the auxiliary cutting inserts. Each of the auxiliary cutting inserts may have a rake face facing the rotational cutting direction, a relief face facing an opposite rotational direction, and a cutting edge joining the rake face and the relief face. Each rake face may include an upper rake face adjacent the cutting edge and a lower rake face adjacent the upper rake face. The upper rake face may extend at a first angle to the longitudinal axis and the second rake face may extend at a larger second angle to the longitudinal axis. The cutting edge of each of the auxiliary cutting inserts may taper from a first axial height at a radially inward portion to a second smaller axial height at a radial outward portion. The first auxiliary cutting insert may be positioned approximately 50°-60° from the first cutting arm in the rotational cutting direction and the second auxiliary cutting insert may be positioned approximately 50°-60° from the third cutting arm in the rotational cutting direction. The auxiliary cutting insets may be offset axially rearward of the radial cutting arms of the primary cutting insert.

Advantages may include one or more of the following. The disclosed drill bits may have significantly improved cutting speed, life, and durability as compared to prior art drill bits. The disclosed drill bits may form holes that are closer to perfectly round than prior art drill bits. These and other advantages and features will be apparent from the description, the drawings, and the claims.

BRIEF DESCRIPTION OF THE DRAWINGS

FIG. 1A is a perspective view of an embodiment of a drill bit.

DETAILED DESCRIPTION

Figure 1B:
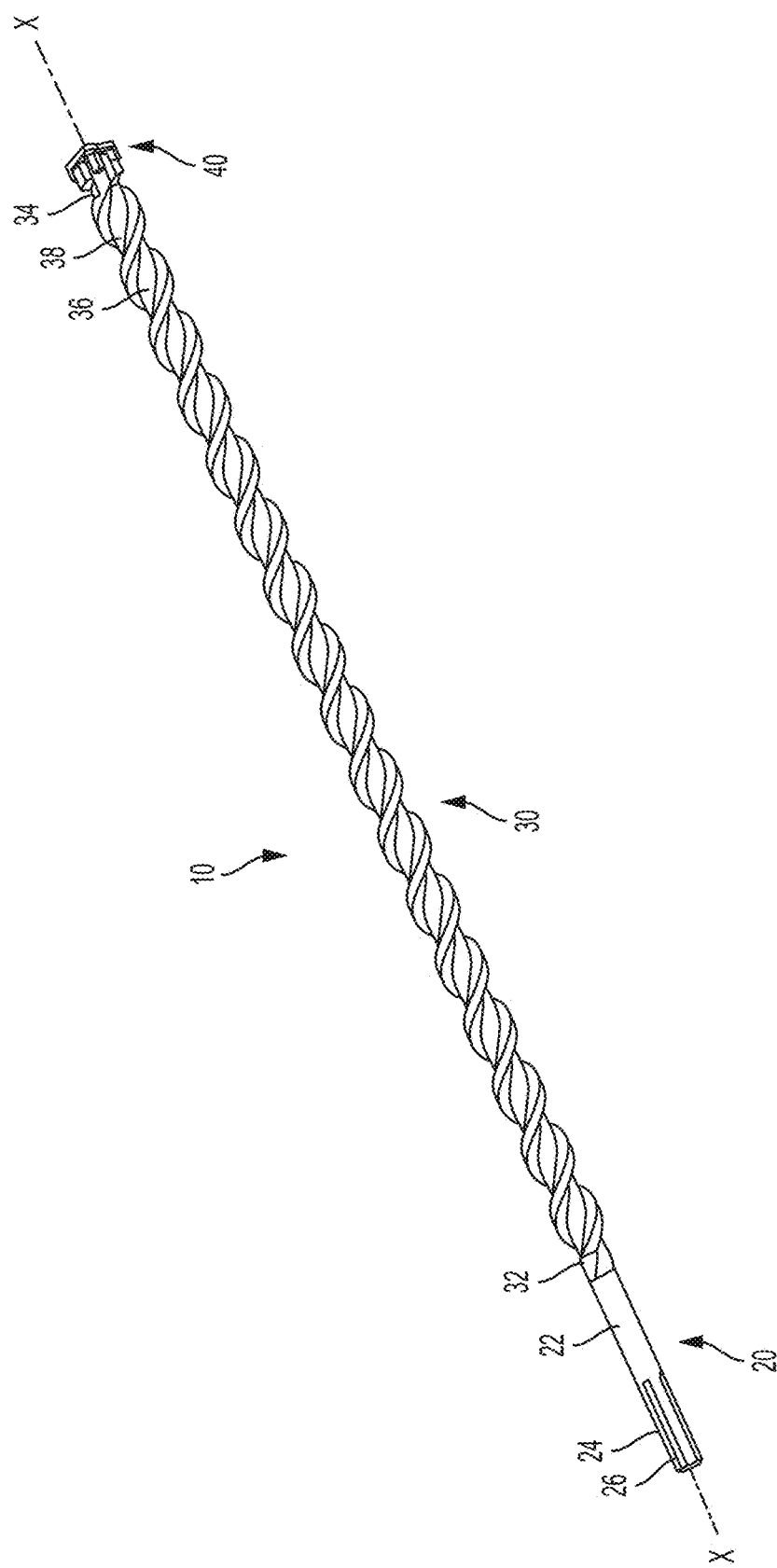
FIG. 1B is a side view of the drill of FIG. 1A.

Referring to FIGS. 1A-2B, in an embodiment, a drill bit 10 includes a rear shank 20, an intermediate shaft 30, and a front cutting head 40, each extending generally along a longitudinal axis X. The shank 20 has a generally cylindrical front end portion 22 coupled to the intermediate shaft 30, and a rear end portion 24 with a power tool connector 26 (e.g., an SDS, an SDS-PLUS, or an SDS-MAX connector) configured to couple the drill bit 10 to a power tool (e.g., a drill, a drill driver, an impact driver, a hammer drill, or a rotary hammer). The intermediate shaft 30 has a rear end 32 coupled to the shank 20 and a front end 34 coupled to the cutting head 40. At least one spiral flute (in this embodiment, a first spiral flute 36 and a second spiral flute 38) extends generally along the entire length of the intermediate shaft 30 to channel dust and debris away from the cutting head 40. The cutting head 40 includes a generally cylindrical body 42, a primary cutting insert 50 and an a pair of auxiliary cutting inserts 70A, 70B fixedly coupled to the body 42, and a pair of primary dust egress slots 90A, 90B and a pair of auxiliary dust egress slots 95A, 95B formed in the body 42 and in communication with the spiral flutes 36, 38.

Figure 3:
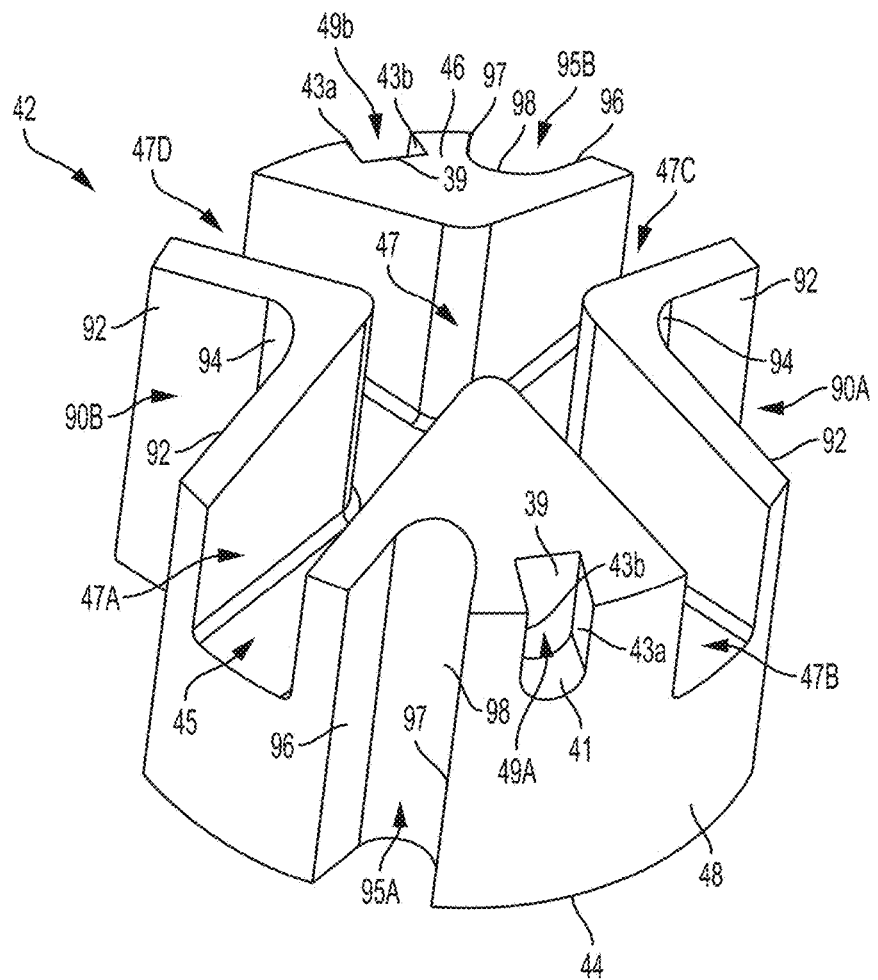
FIG. 3 is a perspective view of the cutting head body of the drill bit of FIG. 1A.

Referring also to FIG. 3, the generally cylindrical body 42 has a rear end 44 coupled to the front end 34 of the intermediate shaft 30, a front end 46, and a generally cylindrical peripheral sidewall 48. The body 42 defines a cross-shaped primary recess 45, having a central recess 47 along the longitudinal axis X and four arms 47A, 47B, 47C, 47D extending radially outward from the central recess 47, substantially perpendicular to each other. The body 42 also defines a single pair of diametrically opposed auxiliary recesses 49A, 49B formed in the peripheral sidewall 48, each having a concave curved bottom wall 41, a pair of generally parallel and straight front and rear sidewalls 43a, 43b extending parallel to the longitudinal axis X, and a generally flat inner face 39 that is generally perpendicular to the sidewalls 43a, 43b, and generally parallel to the longitudinal axis X.

Figure 4A:
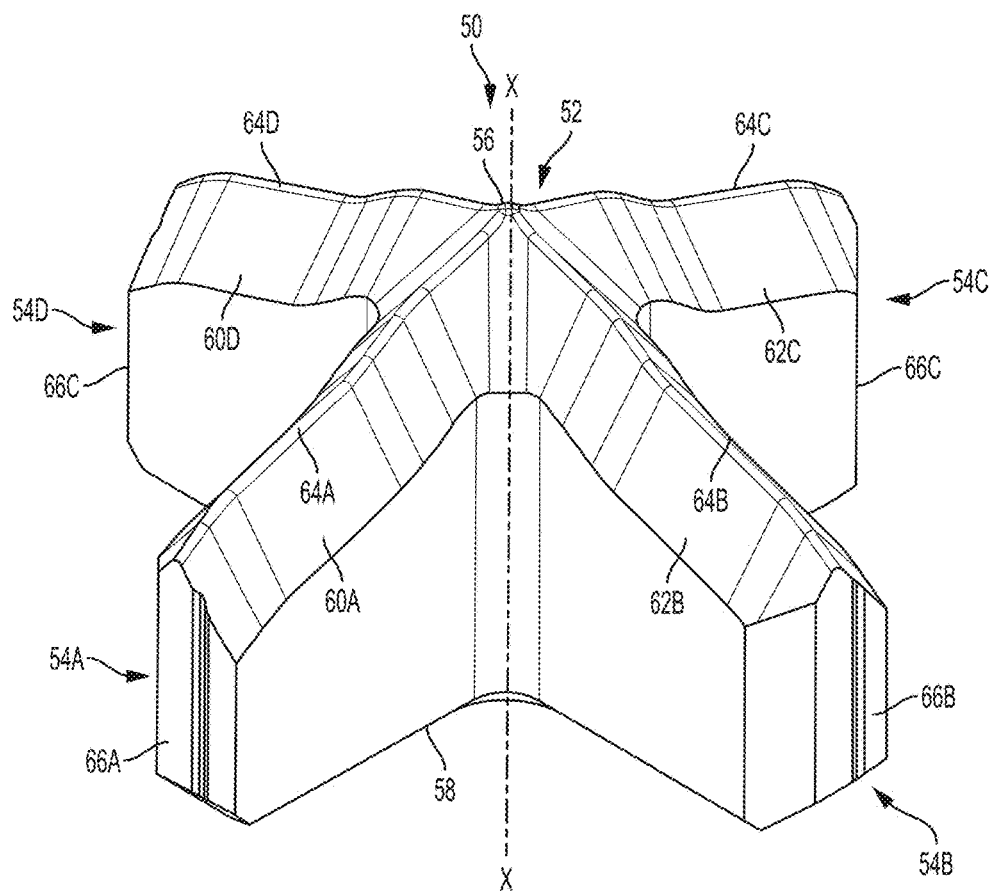
FIG. 4A is a perspective view of the primary cutting insert of the drill bit of FIG. 1A.
Figure 4B:
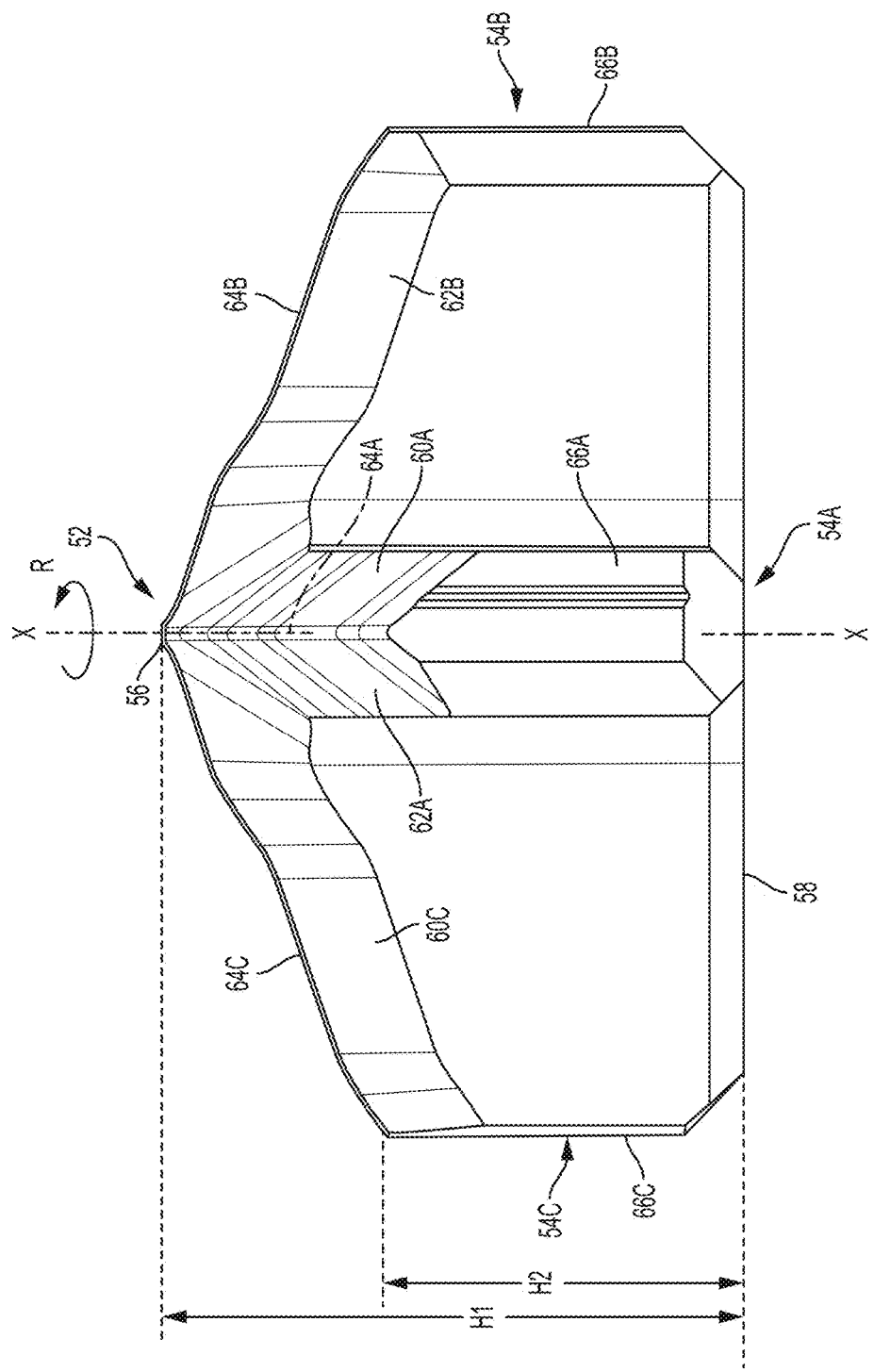
FIG. 4B is a side view of the cutting insert of FIG. 4A.
Figure 5A:
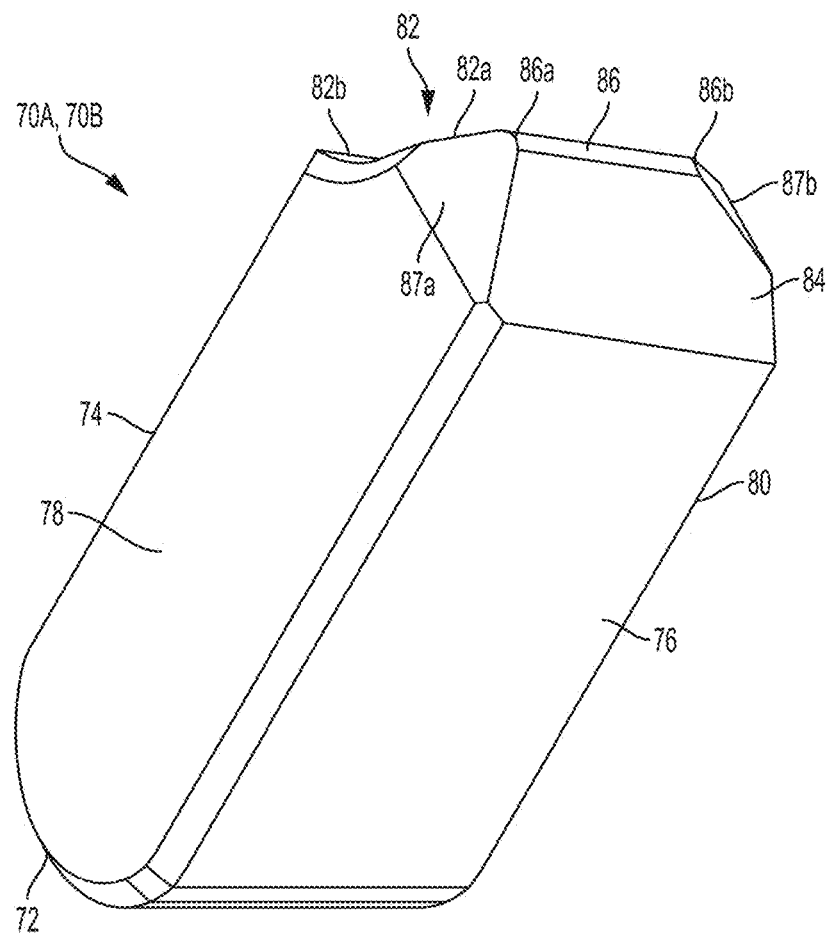
FIG. 5A is a perspective view of the auxiliary cutting insert of the drill bit of FIG. 1A.
Figure 5B:
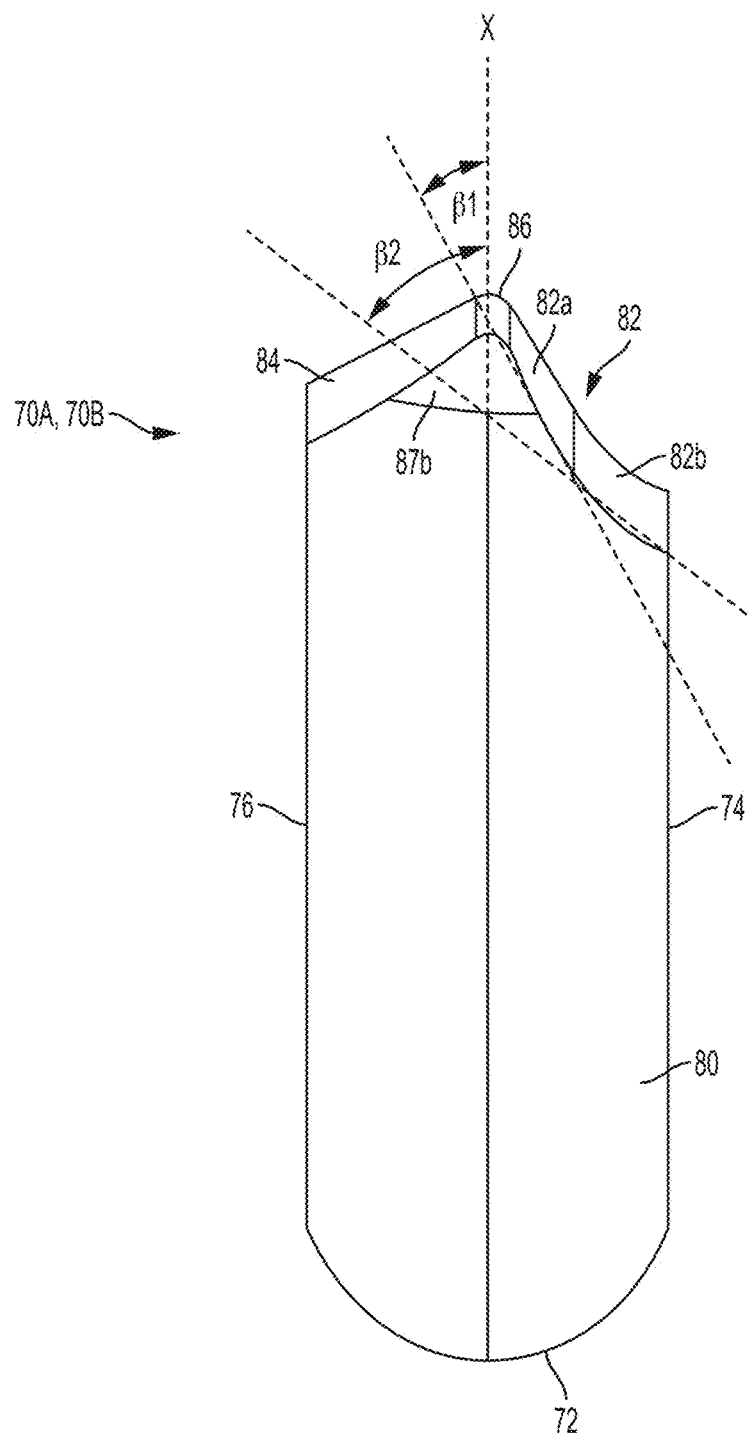
FIG. 5B is a side view of the auxiliary cutting insert of FIG. 5A.
Figure 5C:
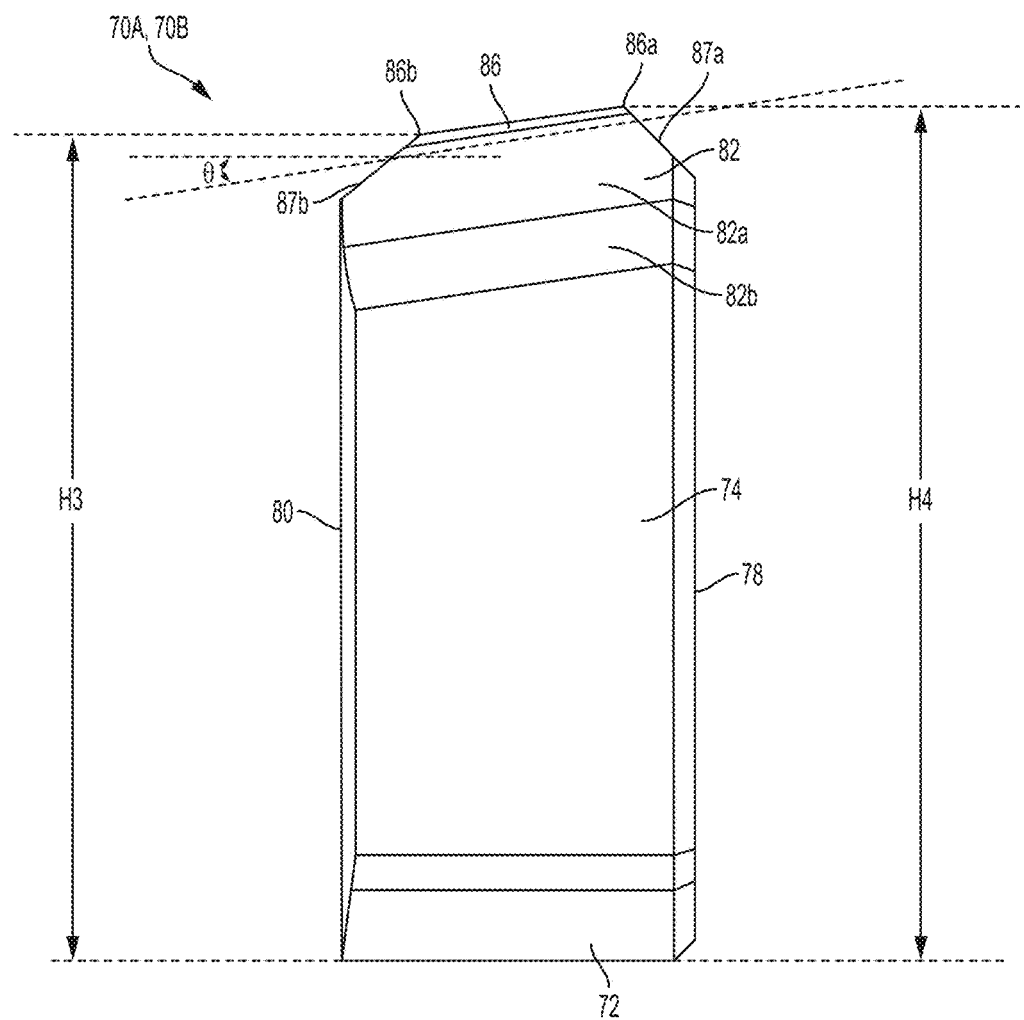
FIG. 5C is a front view of the auxiliary cutting insert of FIG. 5A.

Referring also to FIGS. 4A-4B, the primary cutting insert 50 is cross-shaped, received in the primary recess 45, and fixed to the front end 44 of the body 40 (e.g., by welding or brazing). The primary cutting insert 50 has a bottom surface 58 and a central portion 52 positioned on the longitudinal axis X, and four cutting arms 54A, 54B, 54C, 54D substantially perpendicular to each other and extending radially outward from the central portion 52 toward and beyond the peripheral sidewall 46 of the body 42. The central portion 52 has a central cutting point 56 positioned on the longitudinal axis X. Each cutting arm 54A, 54B, 54C, 54D has a radial end wall 66A, 66B, 66C, 66D, a rake face 60A, 60B, 60C, 60D facing a rotational cutting direction R of the drill bit 10, a relief face 62A, 62B, 62C, 62D facing opposite the rotational cutting direction R, and a cutting edge 64A, 64B. 64C, 64D joining the rake face 60A, 60B, 60C, 60D and the relief face 62A, 62B, 62C, 62D. Each cutting edge 64A, 64B. 64C, 64D extends radially outward from the central cutting point 56 in an axially rearward tapering manner. The central cutting point 56 extends axially forward from the bottom surface 58 to a height H1, such as approximately 18.63 to 19.13 mm (e.g., approximately 18.88 mm). The radial end walls 66A, 66B, 66C, 66D extend axially forward from the bottom surface 58 to a minimum height H2, such as approximately 11 to 12 mm (e.g., approximately 11.6 mm).

Figure 2A:
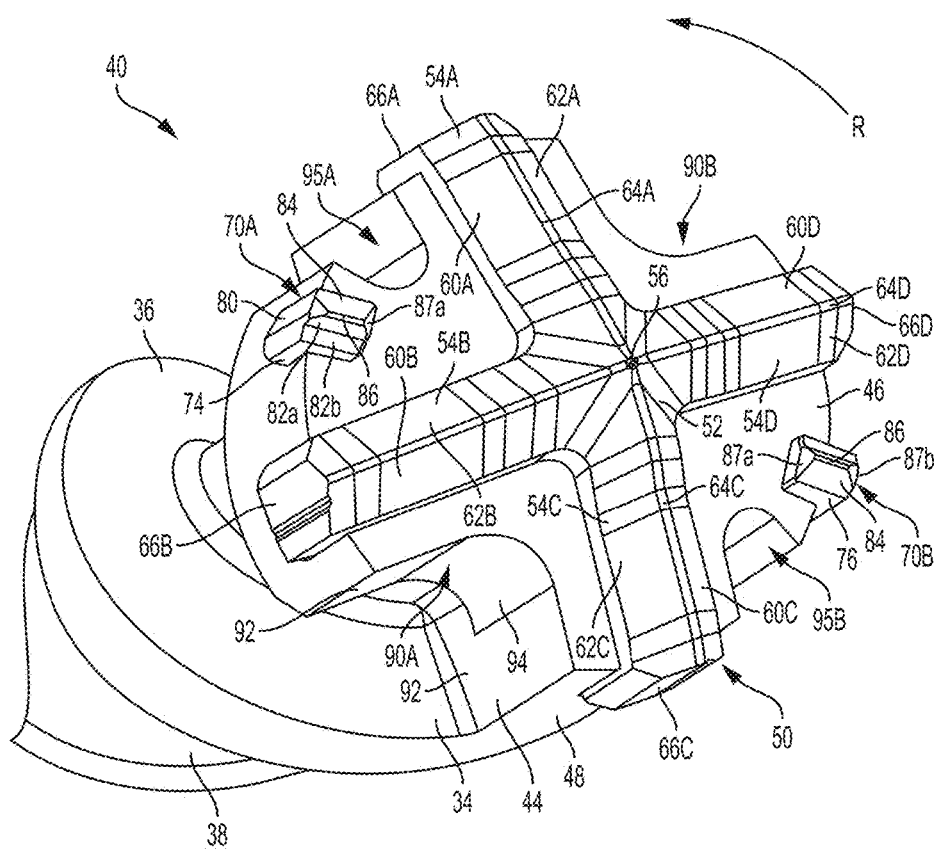
FIG. 2A is an enlarged perspective view of the cutting head of the drill bit of FIG. 1A.
Figure 2B:
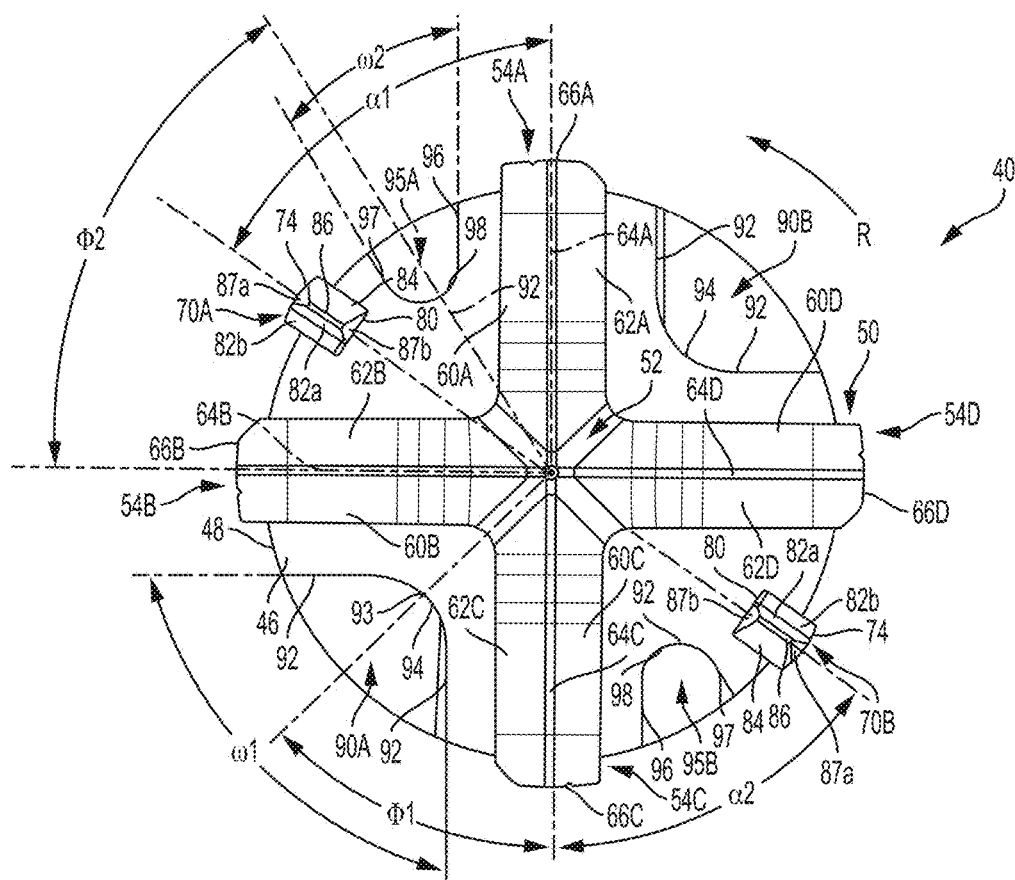
FIG. 2B is an end view of the cutting head of the drill bit of FIG. 1A.

Referring also to FIG. 2B, the auxiliary cutting inserts 70A, 70B are received in the auxiliary recesses 49A, 49B and a fixed to the front end 44 of the body 40 (e.g., by welding or brazing). The auxiliary cutting inserts 70A, 70B are spaced radially outward from the central portion 52 of the primary cutting insert 50 and are spaced circumferentially from each of the radial cutting arms 60A, 60B, 60C, 60D. A first one of the auxiliary cutting inserts 70A is positioned between the first cutting arm 60A and the second cutting arm 60B and a second one of the auxiliary cutting inserts 70B is positioned between the third cutting arm 60C and the fourth cutting arm 60D. In one embodiment, the first auxiliary cutting insert 70A is positioned a first angular distance α1, such as approximately 50° to 60° (e.g., approximately 55°), from the first cutting arm 60A in the rotational cutting direction R, and the second auxiliary cutting insert 70B is positioned a second angular distance α2, such as approximately 50° to 60° (e.g., approximately 55°), from the third cutting arm 70C in the rotational cutting direction R.

Referring also to FIGS. 5A-5E, each of the auxiliary cutting inserts 70A, 70B has a convex curved bottom wall 72 that abuts the concave bottom wall 41 of each of the auxiliary recesses 49A, 49B, and generally flat and parallel front and rear sidewalls 74, 76 that abut the front and rear sidewalls 43a, 43b of each of the auxiliary recesses 49A, 49B. Each of the auxiliary cutting inserts 70A, 70B also has a generally flat inner face 78 that abuts the inner face 39 of each of the auxiliary recesses 49A, 49B, and a generally flat outer face 80 that is generally parallel to the inner face 78, and that extends radially outward beyond the peripheral sidewall 48 of the body 40.

Each auxiliary cutting insert 70A, 70B further includes a rake face 82 facing in the rotational cutting direction R, a relief face 84 facing opposite the rotational cutting direction R, and a cutting edge 86 joining the rake face 82 and relief face 84. The cutting edge 86 has an inner end 86a that is joined to the inner face 78 by an inner facet 87a, and an outer end 86b that is joined to the outer face 80 by an outer facet 87b. Each rake face 82 includes an upper rake face 82a adjacent to and extending downward from the cutting edge and a lower rake face 82b adjacent to and extending downward from the upper rake face 82a to the front sidewall 74. The upper rake face 82a extends at a first acute angle β1 to the longitudinal axis X, such as approximately 29° to 30° (e.g., approximately 30°). The lower rake face 82b extends at a second, larger acute angle β2 to the longitudinal axis X, such as approximately 49° to 50° (e.g., approximately 50°). The upper and lower rake faces 82a, 82b at different rake angles enhances both wear and dust extraction.

The cutting edge 86 tapers axially rearward from the inner end 86a to the outer end 86b at an angle θ to horizontal, such as approximately 8.5° to 9.5° (e.g., approximately 9.0°). This angle creates a contact point rather than line contact for better performance when drilling. At the radially outer end 86b of the cutting edge 86, the auxiliary cutting insert 70A, 70B has a third height H3, such as approximately 8.3 to 8.5 mm (e.g., approximately 8.3 mm). At the radially inner end 86b of the cutting edge 86, the auxiliary cutting insert 70A, 70B has a fourth height H4, such as approximately 8.4 to 8.8 mm (e.g., approximately 8.6 mm).

Figure 6A:
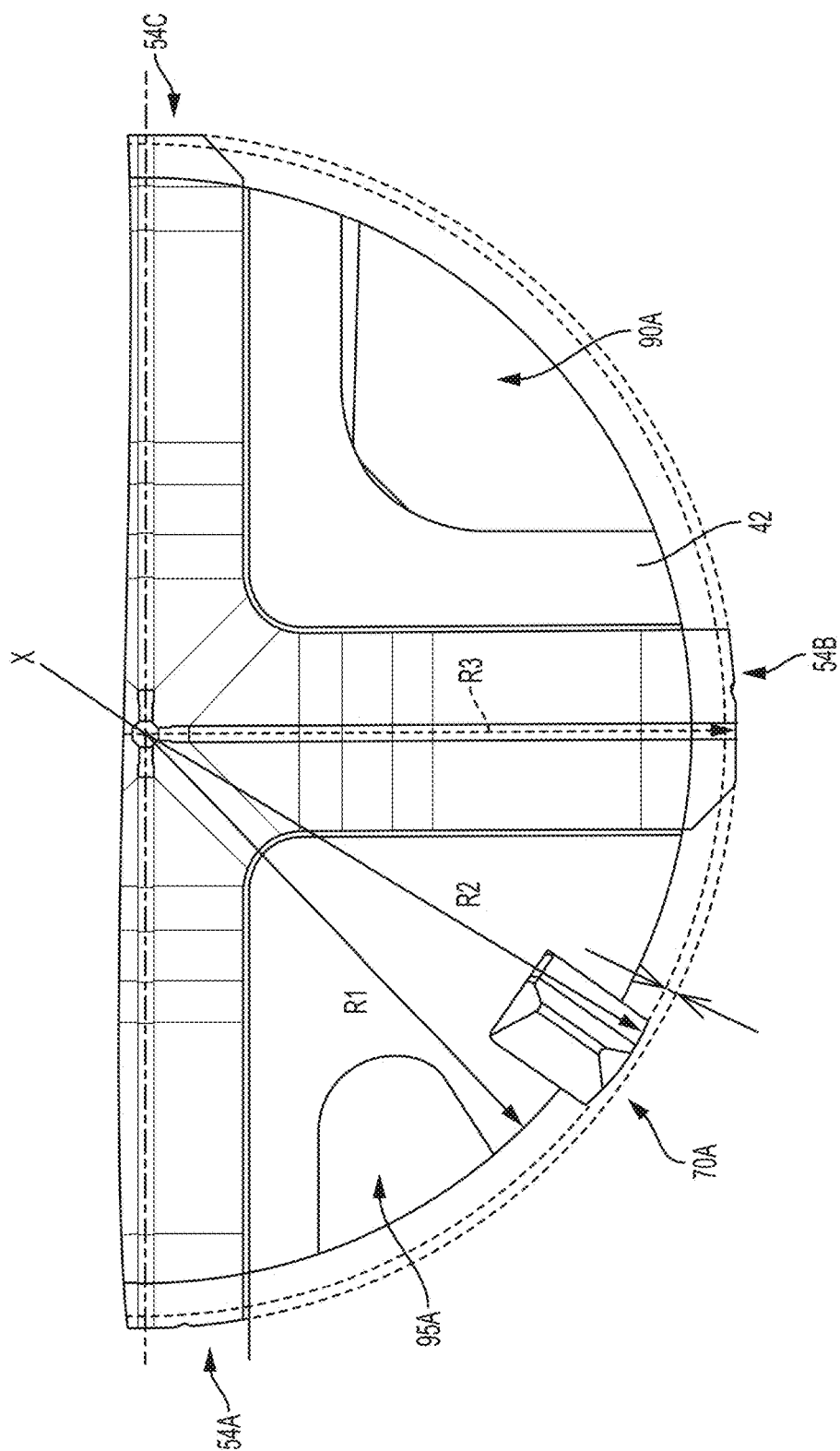
FIG. 6A is an enlarged front end view of the cutting head of the drill bit of FIG. 1A.

Referring to FIG. 6A, the body 42 has a first radius R1 from the longitudinal axis X, such as approximately 14.8 to 15.0 mm (e.g., approximately 15.0 mm). The auxiliary cutting inserts 70A, 70B extend radially outward from the longitudinal axis X by a second radius R2 that is greater than the first radius R1 of the body 42, such as approximately 15.8 to 16.0 mm (e.g., approximately 16.0 mm). The primary cutting arms 54A, 54B, 54C, 54D extend radially outward from the longitudinal axis X by a third radius that R3 that is greater than the second radius R2 of the auxiliary cutting inserts, such as approximately 16.2 to 16.4 mm (e.g., approximately 16.3 mm).

Figure 6B:
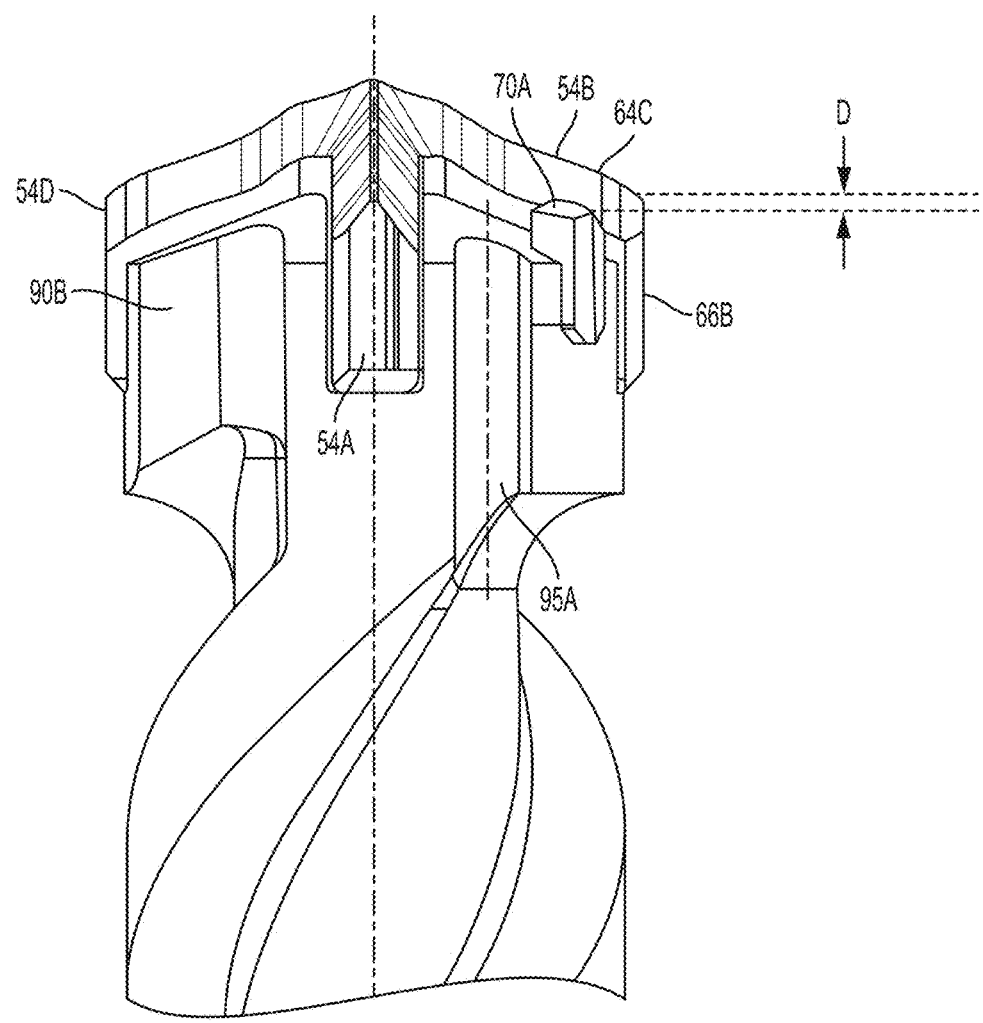
FIG. 6B is an enlarged side view of cutting head and a portion of the intermediate shaft of the drill bit of FIG. 1A.

Referring to FIG. 6B, the most axially forward point on each auxiliary cutting insert 70A, 70B (i.e., the inner radial end 86a of the cutting edge 86) is offset axially rearward by a distance D from the most axially rearward point on the primary cutting insert 50 (i.e., the intersection between the cutting edges 64A, 64B, 64C, 64D and the radial end faces 66A, 66B, 66C, 66D). For example, the offset distance D may be approximately 2.2 to 2.6 mm (e.g., approximately 2.4 mm).

Referring to FIGS. 2A, 2B, 3, and 4A, a pair of primary dust egress slots 90A, 90B are formed in the peripheral sidewall 48 of the body 42 and extend from the front end 46 of the body 42 to the rear end 44 of the body 42. The first primary dust egress slot 90A is positioned between the second and third cutting arms 54B, 54C, and the second primary dust egress slot 90B is positioned between the first and fourth cutting arms 54A, 54D. Each primary dust egress slot 90A, 90B has a pair of straight sidewalls 92 generally parallel to the adjacent cutting arms and to the longitudinal axis X, and a concave sidewall 94 connecting the straight sidewalls 92. The straight sidewalls 92 subtend an angle ω1, such as approximately 89.85° to 90.15° (e.g., approximately 90°). A center point 93 of each primary dust egress slot 90A, 90B is positioned at an angle φ1 from the adjacent cutting arm in the rotational cutting direction R, such as approximately 44.85° to 45.15° (e.g., approximately 45°).

The pair of auxiliary dust egress slots 95A, 95B (which are smaller than the primary dust egress slots 90A, 90B) are formed in the peripheral sidewall 48 of the body 42 and extend from the front end 46 of the body 42 to the rear end 44 of the body 42. The first auxiliary dust egress slot 95A is positioned between the first cutting arm 54A, 54B, and the second auxiliary dust egress slot 95B is positioned between the third and fourth cutting arms 54C, 54D. More particularly, the first auxiliary dust egress slot 95A is positioned between the first cutting arm 54A and the first auxiliary cutting insert 70A, and the second auxiliary dust egress slot 95B is positioned between the third cutting arm 54C and the second auxiliary cutting insert 70B. Each secondary dust egress slot 95A, 95B has a first straight sidewall 96 generally parallel to the adjacent cutting arms 54A, 54C and to the longitudinal axis X, a second straight sidewall 97 adjacent the auxiliary cutting inserts 70A, 70B and generally parallel to the longitudinal axis X, and a concave sidewall 98 connecting the straight sidewalls 96, 97. The straight sidewalls 96, 97 subtend an angle ω2, such as approximately 27° to 37° (e.g., approximately 32°). A center point 99 of each secondary dust egress slot 95A, 95B is positioned at an angle φ2 from the adjacent cutting arms 54A, 54C in the rotational cutting direction R, such as approximately 57° to 59° (e.g., approximately 58°).

The first primary dust egress slot 90A and the first auxiliary dust egress slot 95A are in communication with the first flute 36, while the second primary dust egress slot 90B and the second auxiliary dust egress slot 95A are in communication with the second flute 36 to facilitate removal of dust and debris from a hole being drilled by the drill bit. In another embodiment, the shaft may have a single flute and all of the dust egress slots 90A, 90B, 95A, 95B may be in communication with the single flute. In yet another embodiment, the shaft may have four flutes and each of the dust egress slots 90A, 90B, 95A, 95B may be in communication with its own flute.

The shank 20, intermediate shaft 30, and body 42 of the cutting head 40 of the drill bit 10 may be formed of an alloy steel, such as 34CrNiMo6 steel or 42CrMo4 steel. The primary cutting insert 50 and the auxiliary cutting inserts 70A, 70B may be formed of a hard metal material such as carbide, e.g., tungsten carbide.

In use, during a drilling operation, the central cutting point 54 and the cutting arms 56A, 56B, 56C, 56D of the primary cutting insert 50 are configured to cut a hole in a workpiece. Meanwhile, the auxiliary cutting inserts 70A, 70B are configured to break up debris created by the primary cutting insert 50. The auxiliary cutting inserts 70A, 70B are configured ensure that the hole formed will be closer to a round circle than if only the primary cutting insert 50 was used. The primary and auxiliary dust egress slots are configured to enable removal of debris and dust from the hole being formed, and to channel the dust and debris toward the rearward end of the drill bit via the flutes.

Referring to FIGS. 7-10, experimental results verify significantly improved performance of the drill bit of FIGS. 1A-6B. In an example, samples of a drill bit of the present invention were tested against samples of a prior art DeWALT® XLR® drill bit shown in FIG. 10. The DeWALT® XLR® drill bit 100 has a shank (not shown), an intermediate shaft 130 with flutes 136, 138, and a cutting head 140 with a single cross-shaped primary cutting insert 150 having four generally perpendicular cutting arms 154A, 154B, 154C, 154D. The samples of the drill bit of FIGS. 1A-6B and the DeWALT® XLR® drill bits both were used with a DeWALT® D25762 SDS-Max Combination Rotary Hammer to form five holes having a depth of 30 cm in granite. The total time needed to form the first five holes having a depth of 30 cm was measured.

Figure 7:
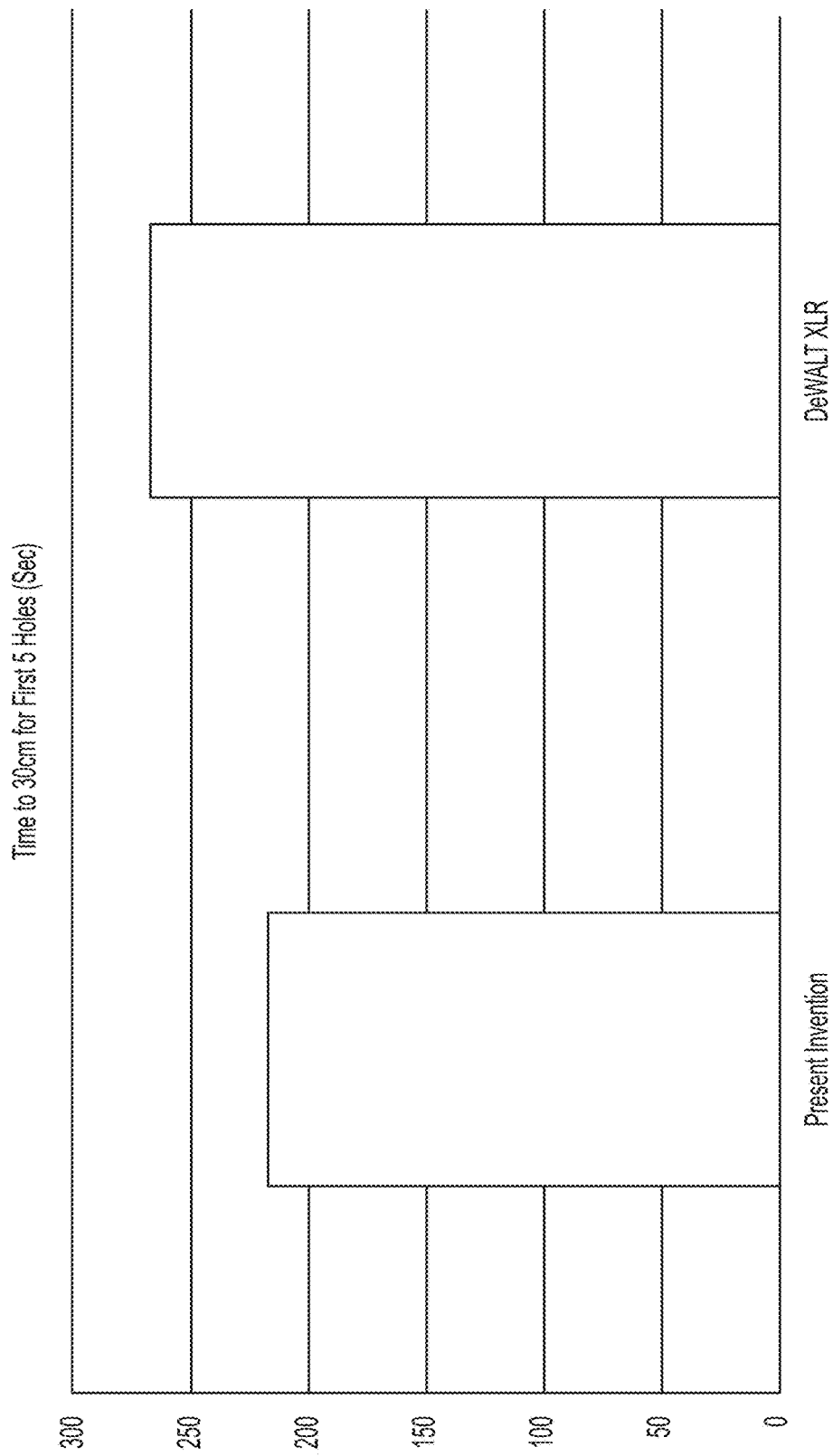
FIG. 7 is a graph showing experimental results in a test of the drill bit of FIG. 1A.
Figure 8:
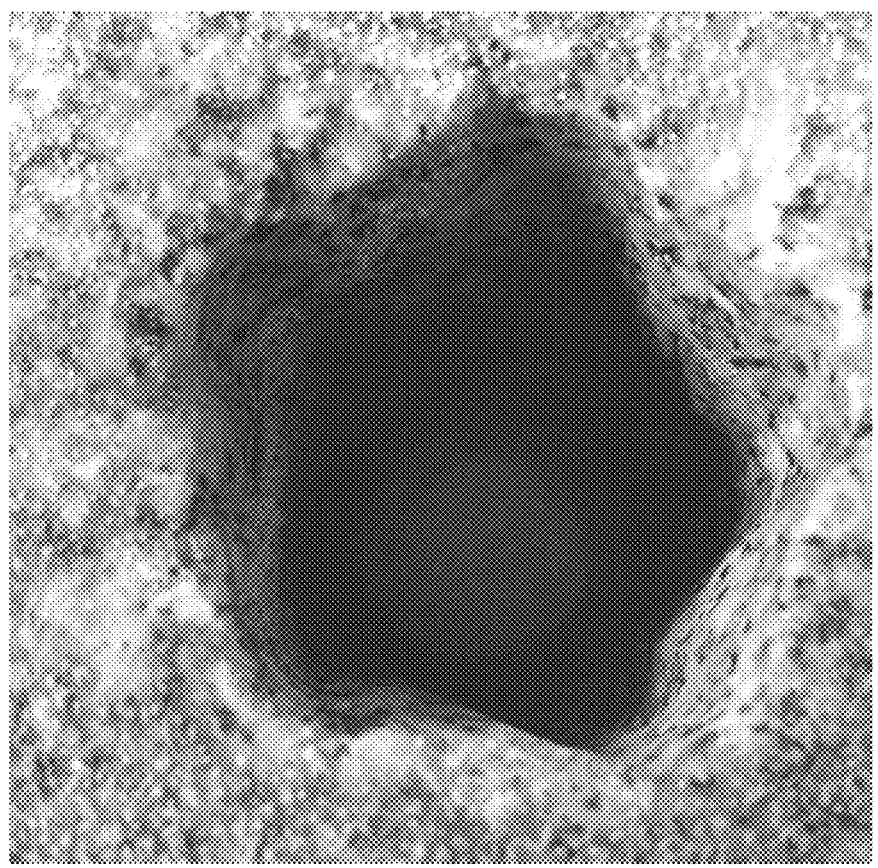
FIG. 8 is a photograph of a hole formed by a prior art drill bit.
Figure 9:
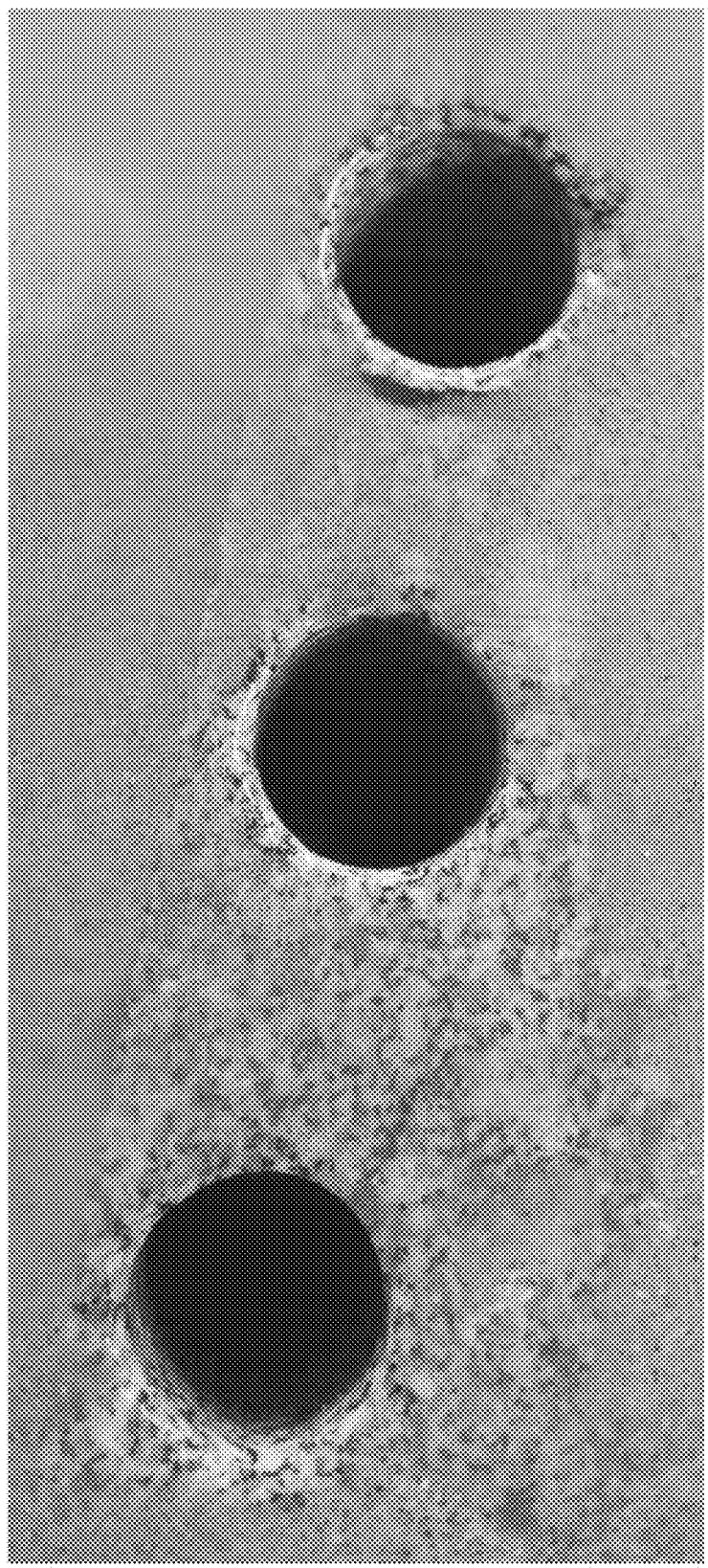
FIG. 9 is a photograph of a hole formed by the drill bit of FIG. 1A.
Figure 10:
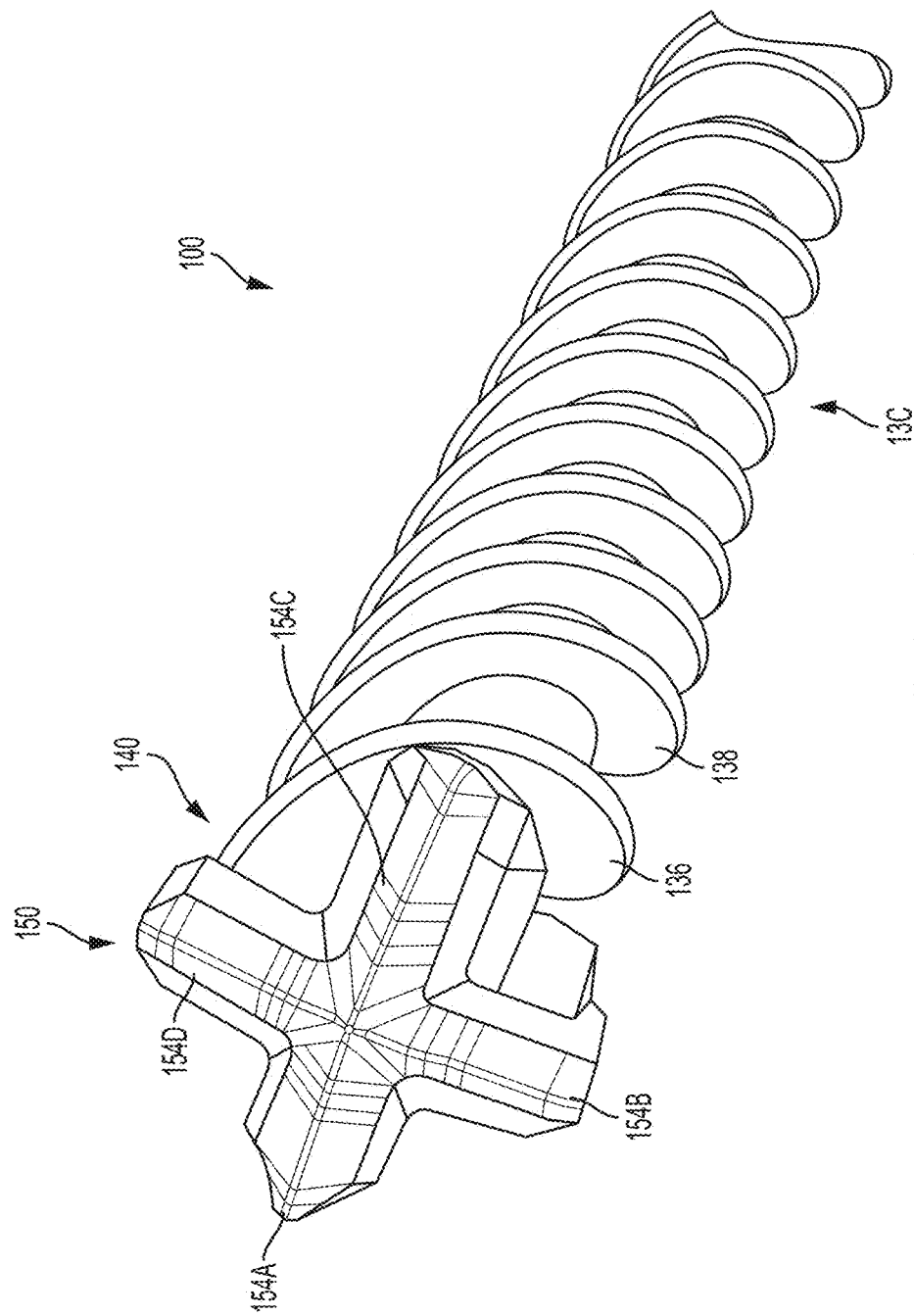
FIG. 10 is a perspective view of a prior art drill bit.

As shown in FIG. 7, the drill bits of FIGS. 1A-6B have significantly improved drilling speed. The average time for the standard DeWALT® XLR® drill bits to form five holes of 30 cm depth was approximately 266 seconds. The average time for the drill bits of FIGS. 1A-6B to form five holes of 30 cm depth was approximately 217 seconds, reflecting a greater than 18% improvement in drilling time. In addition, the drill bits of FIGS. 1A-6B have significantly improved life and durability. In the experiment, the carbide cutting inserts of the DeWALT® XLR® drill bits cracked on average after drilling only two holes, while none of cutting inserts cracked in the drill bits of the present invention, even after drilling five holes. Finally, the drill bits of FIGS. 1A-6B form holes that are closer to being perfectly round. As shown in FIG. 8, the DeWALT® XLR® drill bits formed holes having a cross-sectional shape roughly resembling a five-pointed star. In contrast, as shown in FIG. 9, the drill bits of FIGS. 1A-6B formed holes having a more circular cross section that are closer to being perfectly round. Thus, the drill bits of FIGS. 1A-6B exhibited significantly improved drilling speed, life and durability, and hole quality, as compared to the DeWALT® XLR® drill bits.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The terms "approximately," "generally," and "substantially" have their ordinary meaning and, when referring to dimensions or geometrical relationships generally refer to being within a range of manufacturing tolerances as would be understood to one of ordinary skill in the art. These terms, however, do not exclude equivalents that may be within the scope of the invention.

The method steps, processes, and operations described herein are not to be construed as necessarily requiring their performance in the particular order discussed or illustrated, unless specifically identified as an order of performance. It is also to be understood that additional or alternative steps may be employed. Numerous modifications may be made to the exemplary implementations that have been described above. These and other implementations are within the scope of the following claims.

What is claimed is:

1. A drill bit comprising:
   a shank having a rear end configured to be coupled to a rotary power tool;
   an intermediate shaft defining a longitudinal axis and having a rear end coupled to a front end of the shank and at least one spiral flute; and
   a cutting head having:
   a body having a rear end coupled to a front end of the intermediate shaft, a front end, and a peripheral sidewall;
   a primary cutting insert coupled to a front end of the body, the primary cutting insert having a cross-shape with a central portion, and first, second, third, and fourth cutting arms extending radially outward from the central portion;
   a pair of auxiliary cutting inserts coupled to the front end, each of the auxiliary cutting inserts spaced radially outward from the central portion and spaced circumferentially from each of the radial cutting arms, a first one of the auxiliary cutting inserts positioned between the first cutting arm and the second cutting arm and a second one of the auxiliary cutting inserts positioned between the third cutting arm and the fourth cutting arm;
   a pair of primary dust egress slots formed in the peripheral sidewall of the body and extending from the front end of the body to the rear end of the body, a first of the primary dust egress slots positioned between the second and third cutting arms, and a second of the primary dust egress slots positioned between the first and fourth cutting arms; and
   a pair of auxiliary dust egress slots formed in the peripheral sidewall of the body and extending from the front end of the body to the rear end of the body, a first of the auxiliary dust egress slots positioned between the first and second cutting arms, and a second of the auxiliary dust egress slots positioned between the third and fourth cutting arms.

2. The drill bit of claim 1, wherein the primary cutting insert is configured to cut a hole in a workpiece, the auxiliary cutting inserts are configured to break up debris created by the primary cutting insert, and the primary and auxiliary dust egress slots are configured to enable removal of debris from the hole.

3. The drill bit of claim 1, wherein the cutting arms are perpendicular to one another.

4. The drill bit of claim 1, wherein the pair of auxiliary cutting inserts comprises only a single pair of auxiliary cutting inserts.

5. The drill bit of claim 1, wherein each of the auxiliary cutting inserts extends radially outward beyond the peripheral sidewall and each of the cutting arms of the primary cutting insert extends radially outward beyond the auxiliary cutting inserts.

6. The drill bit of claim 1, wherein each of the auxiliary cutting inserts has a rake face facing the rotational cutting direction, a relief face facing an opposite rotational direction, and a cutting edge joining the rake face and the relief face, each rake face comprising an upper rake face adjacent the cutting edge and a lower rake face adjacent the upper rake face, the upper rake face extending at a first angle to the longitudinal axis and the second rake face extending at a larger second angle to the longitudinal axis.

7. The drill bit of claim 6, wherein the cutting edge of each of the auxiliary cutting inserts tapers from a first axial height at a radially inward portion to a second smaller axial height at a radial outward portion.

8. The drill bit of claim 1, wherein the first auxiliary cutting insert is positioned approximately 50°-60° from the first cutting arm in the rotational cutting direction and the second auxiliary cutting insert is positioned approximately 50°-60° from the third cutting arm in the rotational cutting direction.

9. The drill bit of claim 1, wherein the first auxiliary dust egress slot is positioned approximately 27°-37° from the first cutting arm in the rotational cutting direction and the second auxiliary dust egress slot is positioned approximately 27°-37° from the third cutting arm in the rotational cutting direction.

10. The drill bit of claim 1, wherein the auxiliary cutting insets are offset axially rearward of the radial cutting arms of the primary cutting insert.

11. The drill bit of claim 1, wherein the at least one spiral flute comprises a first spiral flute in communication with the first primary dust egress slot and the first auxiliary dust egress slot, and a second spiral flute in communication with the second primary dust egress slot and the second auxiliary dust egress slot.

12. A cutting head for a drill bit comprising:
a body having a front end and a peripheral sidewall, and defining a longitudinal axis;
a primary cutting insert coupled to a front end of the body, the primary cutting insert having a cross-shape with a central portion, and first, second, third, and fourth cutting arms extending radially outward from the central portion;
a pair of auxiliary cutting inserts coupled to the front end, each of the auxiliary cutting inserts spaced radially outward from the central portion and spaced circumferentially from each of the radial cutting arms, a first one of the auxiliary cutting inserts positioned between the first cutting arm and the second cutting arm and a second one of the auxiliary cutting inserts positioned between the third cutting arm and the fourth cutting arm;
a pair of primary dust egress slots formed in the peripheral sidewall of the body and extending from the front end of the body to the rear end of the body, a first of the primary dust egress slots positioned between the second and third cutting arms, and a second of the primary dust egress slots positioned between the first and fourth cutting arms; and
a pair of auxiliary dust egress slots formed in the peripheral sidewall of the body and extending from the front end of the body to the rear end of the body, a first of the auxiliary dust egress slots positioned between the first and second cutting arms, and a second of the auxiliary dust egress slots positioned between the third and fourth cutting arms.

13. The cutting head of claim 12, wherein the primary cutting insert is configured to cut a hole in a workpiece, the auxiliary cutting inserts are configured to break up debris created by the primary cutting insert, and the primary and auxiliary dust egress slots are configured to enable removal of debris from the hole.

14. The cutting head of claim 12, wherein the cutting arms are perpendicular to one another.

15. The cutting head of claim 12, wherein the pair of auxiliary cutting inserts comprises only a single pair of auxiliary cutting inserts.

16. The cutting head of claim 12, wherein each of the auxiliary cutting inserts extends radially outward beyond the peripheral sidewall, and each of the cutting arms of the primary cutting insert extends radially outward beyond the auxiliary cutting inserts.

17. The cutting head of claim 12, wherein each of the auxiliary cutting inserts has a rake face facing the rotational cutting direction, a relief face facing an opposite rotational direction, and a cutting edge joining the rake face and the relief face, each rake face including an upper rake face adjacent the cutting edge and a lower rake face adjacent the upper rake face, the upper rake face extending at a first angle to the longitudinal axis and the second rake face extending at a larger second angle to the longitudinal axis.

18. The cutting head of claim 12, wherein the first auxiliary cutting insert is positioned approximately 50°-60° from the first cutting arm in the rotational cutting direction and the second auxiliary cutting insert is positioned approximately 50°-60° from the third cutting arm in the rotational cutting direction.

19. The cutting head of claim 12, wherein the auxiliary cutting insets are offset axially rearward of the radial cutting arms of the primary cutting insert.

20. A cutting head for a drill bit comprising:
a body having a front end, a rear end, and a peripheral sidewall, and defining a longitudinal axis;
a primary cutting insert coupled to a front end of the body, the primary cutting insert having a cross-shape with a central portion with a central cutting tip positioned on the longitudinal axis, and first, second, third, and fourth cutting arms each having a cutting edge extending radially outward from the central portion past the peripheral sidewall of the body;
a pair of auxiliary cutting inserts coupled to the front end, each of the auxiliary cutting inserts spaced radially outward from the central portion, spaced circumferentially from each of the radial cutting arms, and having a cutting edge extending radially outward past the peripheral sidewall of the body; and
a plurality of dust egress slots formed in the peripheral sidewall and configured to channel debris from the front end to the rear end of the body.

21. The cutting head of claim 20, wherein the plurality of dust egress slots comprises a pair of primary dust egress slots formed in the peripheral sidewall of the body and extending from the front end of the body to the rear end of the body, a first of the primary dust egress slots positioned between the second and third cutting arms, and a second of the primary dust egress slots positioned between the first and fourth cutting arms.

22. The cutting head of claim 21, wherein the plurality of dust egress slots further comprises a pair of auxiliary dust egress slots formed in the peripheral sidewall and extending from the front end of the body to the rear end of the body, a first of the auxiliary dust egress slots positioned between the first and second cutting arms, and a second of the auxiliary dust egress slots positioned between the third and fourth cutting arms.

23. The cutting head of claim 20, wherein the pair of auxiliary cutting inserts comprises only a single pair of auxiliary cutting inserts.

24. The cutting head of claim 23, wherein each of the auxiliary cutting inserts extends radially outward beyond the peripheral sidewall and each of the cutting arms of the primary cutting insert extends radially outward beyond the auxiliary cutting inserts.

25. The cutting head of claim 23, wherein the first auxiliary cutting insert is positioned approximately 50°-60° from the first cutting arm in the rotational cutting direction and the second auxiliary cutting insert is positioned approximately 50°-60° from the third cutting arm in the rotational cutting direction.

* * * * *